Jan. 12, 1960    HANS-JOACHIM M. FÖRSTER    2,920,728
TRANSMISSION, PARTICULARLY FOR AUTOMOTIVE PURPOSES
Filed July 8, 1957
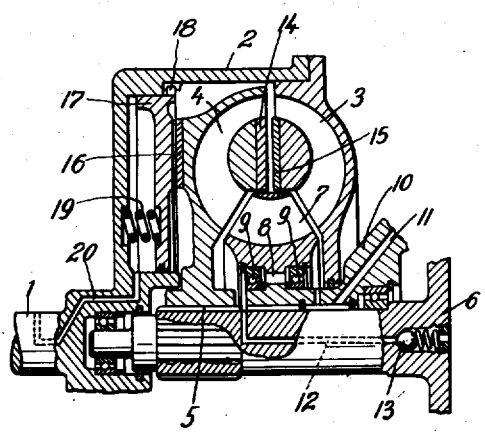
Inventor
HANS-JOACHIM M. FÖRSTER
BY
ATTORNEYS.

United States Patent Office 2,920,728
Patented Jan. 12, 1960

2,920,728

TRANSMISSION, PARTICULARLY FOR AUTOMOTIVE PURPOSES

Hans-Joachim M. Förster, Stuttgart-Bad Cannstatt, Germany, assignor to Daimler-Benz Aktiengesellschaft, Stuttgart-Unterturkheim, Germany Application July 8, 1957, Serial No. 670,552

Claims priority, application Germany July 12, 1956

3 Claims. (Cl. 192—3.2)

My invention relates to a transmission, particularly for automotive purposes, and, more especially, relates to an improvement of the transmission disclosed and claimed in my co-pending U.S. patent application Ser. No. 637,813, filed on February 1, 1957.

The transmission disclosed in such prior application includes a hydrodynamic device composed of an impeller rotor and a turbine rotor mounted for relative axial displacement, one of the rotors, preferably the impeller rotor, being rigidly connected with a rotary housing within which the axially displaceable rotor is disposed, means being provided for producing a force, whereby the two rotors are pressed against each other for the purpose of clutching them by mutual friction, when power is to be transferred from the driving shaft to the driven shaft by mechanical elements only. When the power is to be transmitted by the hydrodynamic function, the rotors of the hydrodynamic device are disengaged from each other by action of the liquid used in the hydrodynamic operation. The force effecting the frictional engagement of the rotors of the hydrodynamic device can be produced by a spring and/or by a fluid under pressure.

It is the object of the present invention to simplify the transmission by the elimination of special bearings provided between the spring support and the rotary housing and to reduce the dimensions of the frictional clutch faces, thus permitting of a reduction of the radial dimensions of the means connecting the driving shaft and the driven shaft.

It is another object of the present invention to dispose the friction faces provided on the rotors of the hydrodynamic device in such a manner that additional space will not be required for such friction faces.

Further objects of my invention will appear from a detailed description of a preferred embodiment thereof illustrated in the accompanying drawing. I wish it to be understood, however, that my invention is in no way restricted to the details of such embodiment and that the terms and phrases used in such detailed description have been chosen for the purpose of illustrating the invention rather than that of restricting or limiting the same.

In the drawing a partial longitudinal section of my novel automotive transmission is illustrated.

The transmission illustrated in the drawing which is particularly fit for automotive purposes comprises a driving shaft 1 and a driven shaft 6. A rotary housing 2 is connected to one of said shafts, preferably with the driving shaft 1, for common rotation therewith. The transmission includes a hydrodynamic device composed of an impeller rotor 3 and a turbine rotor 4. One of the rotors 3, 4 is mounted for common rotation with one of the shafts 1, 2 and the other rotor is mounted for common rotation with the other one of the shafts. The housing 2 is rigidly connected with one of the rotors, preferably with the impeller rotor 3. For this purpose, the impeller rotor 3 is provided with a flange connected with a suitable flange of the housing 2 by a plurality of circumferentially distributed bolts (not shown). The housing 2 surrounds the turbine rotor 4 which is axially movable relative to the housing 2 and the rotor 3 rigid therewith. For this purpose the driven shaft 6 is provided with a splined portion 5 engaging longitudinal internal grooves provided in the hub portion of the turbine rotor 4.

Moreover, the hydrodynamic device includes a third rotor 7 mounted for rotation about the common axis of the rotors 3 and 4. The rotors 3 and 4 cooperate to form a split toroidal member and the three rotors 3, 4, and 7 are provided with suitable liquid conducting means including vanes for circulating liquid around the toroidal member. The third rotor 7 which serves the purpose of taking up the reactionary forces exerted upon the circulating liquid is journaled for rotation by means of ball bearings 9 on a sleeve which surrounds the driven shaft 6 and is carried by a portion 10 of the stationary housing of the transmission. A free-wheeling clutch including clamping rollers 8 is provided between the rotor 7 and said sleeve. The stationary housing portion 10 is provided with a duct 11 through which the liquid required for the hydrodynamic operation may be admitted to the transmission. Preferably, the liquid is continuously fed to the duct 11 and, after the housing 2 has been filled with liquid, the surplus thereof is discharged through a conduit 12 provided in the driven shaft 6, a spring-biased check valve 13 being inserted in the duct 12.

In the housing 2 a clutch plate 17 is mounted for axial movement between an engaging position in contact with the rotor 4 and a disengaging position. The axially movable rotor 4 has opposite friction faces 16 and 14. Preferably, these faces are provided with friction linings. The friction face 16 is adapted to be engaged by the clutch plate 17, whereas the friction face 14 may engage a friction face 15 provided on the impeller rotor 3.

The rotors 3 and 4 cooperate to form the above-mentioned split toroidal member composed of two sections which are provided with the friction faces 14 and 15 for mutual engagement. The clutch plate 17 is an annular plate having its outer periphery mounted in slidable contact with a cylindrical internal surface of the casing 2, whereas the inner periphery of the disk 16 is slidably mounted on a cylindrical flange of the housing 2 surrounding the driven shaft 6. Moreover, the plate 18 is provided with peripheral projections 18 engaging internal longitudinal grooves of the housing 2 to thereby secure the clutch plate 17 in the housing 2 against relative rotation thereto.

Suitable means are provided for urging the clutch plate 17 into engaging position relative to the rotor 4. In the embodiment shown such means comprise resilient means, such as springs 19, disposed between the end wall part of the housing 2 and the clutch plate 17. These springs tend to urge the plate 17 into engagement with the rotor 4 and to urge the latter into engagement with the rotor 3. The space between the end wall part of the housing 2 and the clutch plate 17 accommodating the springs 19 is vented by a suitable vent duct 20 which is provided in the driving shaft 1 and leads into the atmosphere. If desired, the duct 20 may be connected with a suitable source of pressure liquid for the admission of the latter into the space between the end wall of the housing 2 and the clutch plate 17. In this event, the springs 19 may or may not be omitted.

The operation of the novel transmission is as follows:

When a transmission of the power from the driving shaft 1 to the driven shaft 6 in a purely mechanical way is desired, the feed of the liquid through the duct 11 is discontinued. As a result, the springs 19 will urge the clutch plate 17 towards the right with reference to the drawing, whereby the elements 17, 4 and 3 will be caused to bring their friction faces 16, 14, and 15 into mutual engagement. As a result, a torque will be transmitted from the shaft 1 to the shaft 6 in a purely mechanical manner by friction.

If the hydrodynamic transfer of power from shaft 1 to shaft 6 is desired, a liquid under pressure is fed to the duct 11. This liquid fills the housing 2 and the conducting means formed by the rotors 3, 4, and 7 and will be circulated by the latter around the toroidal member. Owing to the interaction between the liquid and the vanes of the three rotors 3, 4, and 7 the torque acting on the driving shaft 1 and impeller 3 rigidly connected therewith will be transferred by the liquid to the turbine rotor 4 and the driven shaft 6 connected therewith. Owing to the provision of the spring-biased check valve 13 the liquid in the housing 2 will be kept under pressure. This pressure acts on the right-hand side of the clutch plate 17 causing the latter to move to the left compressing the springs 19 and thus releasing the frictional engagement of the turbine rotor 4 with the elements 3 and 17. Hence, no mechanical contact occurs between the clutch plate 17 and the friction lining 16 nor do the friction linings 14 and 15 engage each other. From the foregoing it will appear that the duct 11 constitutes selectively operable means for causing fluid pressure to move the clutch plate 17 into disengaging position shown contrary to the tendency of the springs 19.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a transmission, the combination comprising a driving shaft, a driven shaft, a rotary housing, a hydrodynamic device in said housing composed of a first rotor and of a second rotor, one of said rotors being an impeller rotor and the other one being a turbine rotor, said first rotor being rigidly connected with one of said shafts and said housing and said second rotor being mounted for common rotation with the other one of said shafts and being axially movable relative to said housing, a clutch plate mounted in said housing in spaced relationship to said first rotor with said second rotor therebetween, said plate being axially movable between an engaging position in contact with said second rotor and a disengaging position, means for urging the clutch plate into said engaging position, said second rotor having friction faces for engagement with both said clutch plate and said first rotor, and selectively operable means for causing said clutch plate to move into said disengaging position.

2. The combination claimed in claim 1 in which said rotors cooperate to form a split toroidal member and liquid conducting means for circulating liquid around said member, said toroidal member being composed of two sections provided with said friction faces for mutual engagement.

3. In a transmission, the combination comprising a driving shaft, a driven shaft, a rotary housing, a hydrodynamic device in said housing composed of a first rotor and of a second rotor, one of said rotors being an impeller rotor and the other one being a turbine rotor, said first rotor being rigidly connected with one of said shafts and said housing and said second rotor being mounted for common rotation with the other one of said shafts and being axially movable relative to said housing, a clutch plate mounted in said housing in spaced relationship to said first rotor with said second rotor therebetween, said plate being axially movable between an engaging position in contact with said second rotor and a disengaging position, resilient means disposed between a part of said housing and said clutch plate for urging the clutch plate into said engaging position, said second rotor having friction faces for engagement with both said clutch plate and said first rotor, and selectively operable means for causing said clutch plate to move into said disengaging position.

References Cited in the file of this patent

UNITED STATES PATENTS

| 1,298,990 | Mason | Apr. 1, 1919 |
| 2,408,951 | Pollard | Oct. 8, 1946 |